（12) United States Patent
Yacovone et al.

(10) Patent No.: US 12,459,241 B2
(45) Date of Patent: Nov. 4, 2025

(54) TEXTURED INTERLAYERS

(71) Applicant: SOLUTIA INC., St. Louis, MO (US)

(72) Inventors: Vincent J. Yacovone, Springfield, MA (US); Jun Lu, Greeneville, TN (US)

(73) Assignee: Solutia Inc., St. Louis, MO (US)

(*) Notice: Subject to any disclaimer, the term of this patent is extended or adjusted under 35 U.S.C. 154(b) by 79 days.

(21) Appl. No.: 18/550,050

(22) PCT Filed: Mar. 8, 2022

(86) PCT No.: PCT/US2022/019235
§ 371 (c)(1),
(2) Date: Sep. 11, 2023

(87) PCT Pub. No.: WO2022/192175
PCT Pub. Date: Sep. 15, 2022

(65) Prior Publication Data
US 2024/0165923 A1    May 23, 2024

Related U.S. Application Data

(60) Provisional application No. 63/200,525, filed on Mar. 12, 2021.

(51) Int. Cl.
*B32B 17/10* (2006.01)

(52) U.S. Cl.
CPC .. *B32B 17/10587* (2013.01); *B32B 17/10036* (2013.01); *B32B 17/10761* (2013.01); *B32B 17/10816* (2013.01); *B32B 17/10926* (2013.01)

(58) Field of Classification Search
CPC ........ B32B 17/10587; B32B 17/10036; B32B 17/10761; B32B 17/10816; B32B 17/10926; B32B 17/10935
See application file for complete search history.

(56) References Cited

U.S. PATENT DOCUMENTS 5,190,826 A   3/1993   Asahina et al.
5,340,654 A   8/1994   Ueda et al.
(Continued)

FOREIGN PATENT DOCUMENTS

JP   H09241045 A   9/1997
JP   H09295839 A   11/1997
(Continued)

OTHER PUBLICATIONS

Saflex Q Series Laminating Guide, Eastman, https://saflex-vanceva.eastman.com/content/dam/saflex/pdf-documents/auto/advanced-documents/lamination_guide_-_saflex_q_series_-_june_2020.pdf, Jun. 30, 2020. (Year: 2020).*
(Continued)

*Primary Examiner* — Christopher W Raimund
(74) *Attorney, Agent, or Firm* — Steven A. Owen

(57) ABSTRACT

The invention provides a PVB interlayer sheet having a surface topography on at least one surface which is characterized as having a relatively low profile and a controlled, collapsible surface roughness profile (upon exposure to heat) having a population of significantly more surface peaks than negative peaks (valleys) in certain embodiments and slightly more distant peak spacing than is generally found in embossed PVB interlayers. The PVB interlayer sheets of the invention thus provide very good initial contact and tack of PVB to a glass surface, while leaving very little residual air behind after a first nip in a traditional glass lamination process when compared to other surface designs. The PVB interlayer sheets of the invention also exhibit a wide deairing window which affords greater tolerance of temperature and process variations.

13 Claims, 4 Drawing Sheets

(56) References Cited

U.S. PATENT DOCUMENTS

| | | | |
|---|---|---|---|
| 5,455,103 | A | 10/1995 | Hoagland et al. |
| 5,837,625 | A | 11/1998 | Phillips et al. |
| 5,972,505 | A | 10/1999 | Philipps et al. |
| 7,510,771 | B2 | 3/2009 | Lu |
| 7,704,342 | B2 | 4/2010 | Bourcier et al. |
| 7,846,532 | B2 | 12/2010 | Lu et al. |
| 7,883,761 | B2 | 2/2011 | Bourcier et al. |
| 7,886,871 | B2 | 2/2011 | Miyai |
| 8,033,360 | B2 | 10/2011 | Miyai |
| 8,574,706 | B2 | 11/2013 | Lu et al. |
| 8,695,756 | B2 | 4/2014 | Miyai |
| 9,574,028 | B2 | 2/2017 | Yacovone |
| 9,833,976 | B2 | 12/2017 | Lu |
| 10,471,686 | B2 | 11/2019 | Nakayama et al. |
| 10,500,826 | B2 | 12/2019 | Strube et al. |
| 10,584,446 | B2 | 3/2020 | Burazin et al. |
| 2008/0254302 | A1 | 10/2008 | Bourcier et al. |
| 2008/0268204 | A1 | 10/2008 | Bourcier et al. |
| 2012/0135191 | A1 | 5/2012 | Spangler et al. |
| 2013/0236693 | A1 | 9/2013 | Lu |
| 2014/0302281 | A1 | 10/2014 | Yacovone |
| 2017/0121475 | A1 | 5/2017 | Yacovone |
| 2018/0029342 | A1 | 2/2018 | Lu |
| 2021/0253911 | A1 | 8/2021 | Santoso et al. |
| 2022/0161515 | A1* | 5/2022 | Kim .................... C08J 5/18 |

FOREIGN PATENT DOCUMENTS

| | | |
|---|---|---|
| JP | H1017338 A | 1/1998 |
| JP | H10231150 A | 9/1998 |
| JP | 2000044295 A | 2/2000 |
| JP | 2002104846 A | 4/2002 |
| KR | 102250607 B1 | 5/2021 |

OTHER PUBLICATIONS

Notification of Transmittal of the International Search Report and the Written Opinion of the International Searching Authority, or the Declaration received in International Application No. PCT/US2022/019235, date of mailing Jun. 29, 2022.

Blateyron, Francois, "New 3D Parameters and Filtration Techniques for Surface Metrology", 2006, pp. 1-7.

Wikimedia Foundation. (n.d.-a). "Abbott-Firestone Curve." Wikipedia. https://en.wikipedia.org/wiki/Abbott-Firestone_curve (accessed Jun. 9, 2023).

Michigan Metrology, LLC. (n.d.). "3D Functional Parameters". https://michmet.com/glossary-term-category/functional/ (accessed Jun. 9, 2023).

Wikimedia Foundation. (n.d.). "Euler Characteristic", Wikipedia. https://en.wikipedia.org/wiki/Euler_characteristic (accessed Jun. 9, 2023).

Wikimedia Foundation. (n.d .- b). "Fractal Dimension", Wikipedia. https://en.wikipedia.org/wiki/Fractal_dimension (accessed Jun. 9, 2023).

* cited by examiner

TEXTURED INTERLAYERS

CROSS-REFERENCE TO RELATED APPLICATION(S)

This application is a national stage filing under 35 USC § 371 of International Application Number PCT/US2022/019235, filed on, Mar. 8, 2022 which claims the benefit of the filing date to U.S. Provisional Application No. 63/200,525, filed on Mar. 12, 2021, the entire disclosures of which are incorporated by reference herein.

FIELD OF THE INVENTION

The invention belongs to the field of polymer interlayers useful in safety glass applications.

BACKGROUND OF THE INVENTION

Poly(vinyl butyral) (PVB) is a poly(vinyl acetal) which is commonly used in the manufacture of polymer sheets that can be used as interlayers in light-transmitting laminates such as safety or architectural glass or polymeric laminates. Safety glass typically refers to a transparent laminate comprising a poly(vinyl butyral) sheet disposed between two panes of glass. Safety glass often is used to provide a transparent barrier in architectural and automotive openings. Its main function is to absorb energy, such as that caused by a blow from an object, without allowing penetration through the opening.

Safety glass can be formed by a process in which two layers of glass and a plastic interlayer, such as poly(vinyl butyral), are assembled into a pre-press, tacked into a pre-laminate, and finished into an optically clear laminate. The assembly phase can involve laying down a piece of glass, overlaying a poly(vinyl butyral) sheet on that glass, laying down a second piece of glass on the poly(vinyl butyral) sheet, and then trimming the excess poly(vinyl butyral) to the edges of the glass layers.

PVB interlayers can be laminated between glass using techniques known in the art. The typical glass lamination process comprises the following steps: (1) assembly of the two substrates (e.g., glass) and interlayer; (2) heating the assembly via an infrared (IR) radiant or convective means for a short period; (3) passing the assembly into a pressure nip roll for a first deairing; (4) heating the assembly a second time to about 50° C. to about 120° C. to give the assembly enough temporary adhesion to seal the edge of the interlayer; (5) passing the assembly into a second pressure nip roll to further seal the edge of the interlayer and allow further handling; and (6) autoclaving the assembly at temperatures between 135° and 150° C. and pressures between 150 psig and 200 psig for about 30 to 90 minutes. Other means for use in de-airing of the interlayer-glass interfaces (steps 2 to 5) known in the art and that are commercially practiced include vacuum bag and vacuum ring processes in which a vacuum is utilized to remove the air. An alternate lamination process involves the use of a vacuum laminator that first de-airs the assembly and subsequently finishes the laminate at a sufficiently high temperature and vacuum.

Lamination systems which utilize only relatively short nip (or squeeze) rolling processes, i.e., with no vacuum, can occasionally result in significant defects visible on the final laminated glass product. One of these undesirable defects, referred to as "iceflowers", is formed by trapped air that nucleates and expands at high temperature. Accordingly, in such shortened processes, a need exists for improved materials and processes which reduce or eliminate the trapped air, therefore reducing or eliminating the occurrence of such defects.

The iceflower defect is a very low occurring but costly defect to laminators and OEM's for automobiles because it is usually not found until after installation in a vehicle when the windshield is part of a much more valuable structure. The iceflower defect is seen in multi-layer (co-extruded or laminated) PVB sheets. It is believed to originate because of poor deairing and heightened by the stress of mismatched bending gaps in matched pairs of windshield safety glass, although other causes or factors may also contribute to the formation.

SUMMARY OF THE INVENTION

The invention provides a PVB interlayer sheet having a surface topography on at least one surface which is characterized as having a relatively low profile and a controlled, collapsible surface roughness profile (upon exposure to heat) having a population of significantly more surface peaks than negative peaks (valleys) in certain embodiments and slightly more distant peak spacing than is generally found in embossed PVB interlayers. The PVB interlayer sheets of the invention thus provide very good initial contact and tack of PVB to a glass surface, while leaving very little residual air behind after a first nip in a traditional glass lamination process when compared to other surface designs. The PVB interlayer sheets of the invention, when used in laminated glass, also allow a wide deairing window which affords greater tolerance of temperature and process variations.

DETAILED DESCRIPTION OF THE INVENTION

Figure 1:
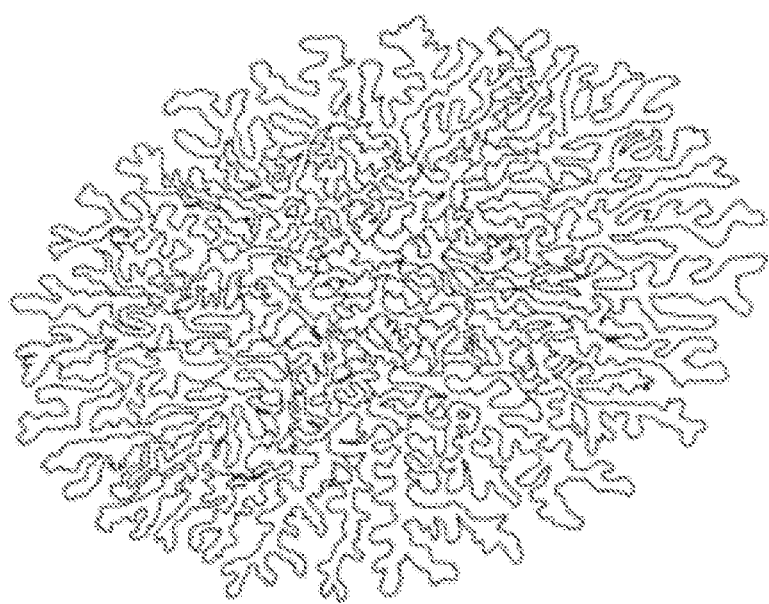
FIG. 1 is a depiction of a defect known as an "iceflower" which forms in an installed windshield.

There are a wide variety of surface metrology parameters that can describe the various features of textured surfaces. Raw profiles can be generated for a surface by contact or non-contact means. The profiles are usually then filtered to remove noise and define the roughness and waviness regions for further analysis. These profiles are then analyzed and grouped into smaller sub-groupings where surface roughness, core roughness, waviness or even motif type parameters have been defined to provide characterization for comparisons.

Some key surface roughness parameters include roughness height (Rz) and roughness mean spacing (Rsm) among many others. Another is a core roughness parameter known as the Abbot-Firestone Curve, or Bearing Area Curve, or material ratio curve, from which many such parameters describing the two or three-dimensional geometry of a textured planar surface can be derived. (See, for example, DIN EN ISO 13565-1 and -2:1998, which describe such geometries and parameters in detail).

The primary instrument used for the R-parameter (Rz, Rsm, Mr1, Mr2) surface measurements is the Mahr Perthometer S3P v 2.5 ("S3P"). It is a stylus contact type device which allows the evaluation of standard parameters. The measuring instrument comprises a drive unit (PGK), a probe (RFHTB) and an LED output screen. Evaluations of S3P instrument parameters are generally done per DIN 4776 standard. A two-dimensional image of the profile is produced via movement of the stylus tip over the surface structure. This movement is converted into digital values and originally stored in a D-profile which contains about 8,000 values evenly distributed over the tracing length. For these measurements, a 17.5 mm tracing length with 2.5 mm cutoff length was used (according to DIN 4776).

The S-parameters, which are three dimensional parameters, were determined per ISO25178 by a Keyence violet laser light microscope with a ¼"×¼" spot size. These parameters are not measurable by the S3P profilometer instrument.

In a first aspect, the invention provides a poly(vinyl acetal) sheet having at least one textured surface, wherein said surface is characterized by:
  a. an Mr2/Mr1 ratio of about 3 to about 10, as determined by ISO 13565-2;
  b. a surface roughness, Rz, of about 20 µm to about 60 µm;
  c. an Sdr value of greater than or equal to about 0.1 and less than about 0.414, as determined by ISO 25178;
  d. an Rsm value of about 230 µm to about 600 µm; and
  e. a surface retention value (Rz2/Rz1) at 100° ° C. of less than 85%.

In one embodiment, the surface roughness, Rz, is determined by a Mahr Perthometer S3P v 2.5 machine. The Rz is determined by averaging 3 distinct measurement values. In one embodiment, the surface roughness, Rz, is about 25 µm to about 50 µm.

In one embodiment, the Mr2/Mr1 ratio is about 4 to about 10, and in another embodiment, is about 4 to about 9 or about 5 to 9, as measured according to ISO 13565-2.

In another embodiment, the textured poly(vinyl acetal) sheet can be further characterized by having an Str value of greater than zero but less than about 0.9 (no units), about 0.15 to about 0.9, or about 0.4 to about 0.7, as determined by ISO 25178.

In one embodiment, the poly(vinyl acetal) is poly(vinyl butyral).

Turning to the Figures, FIG. 1 is a depiction of a defect known as an "iceflower" which forms in an installed windshield which results from incomplete deairing during the formation of the glass-interlayer laminate. A description of how to simulate iceflowers is described and provided below.

Figure 2:
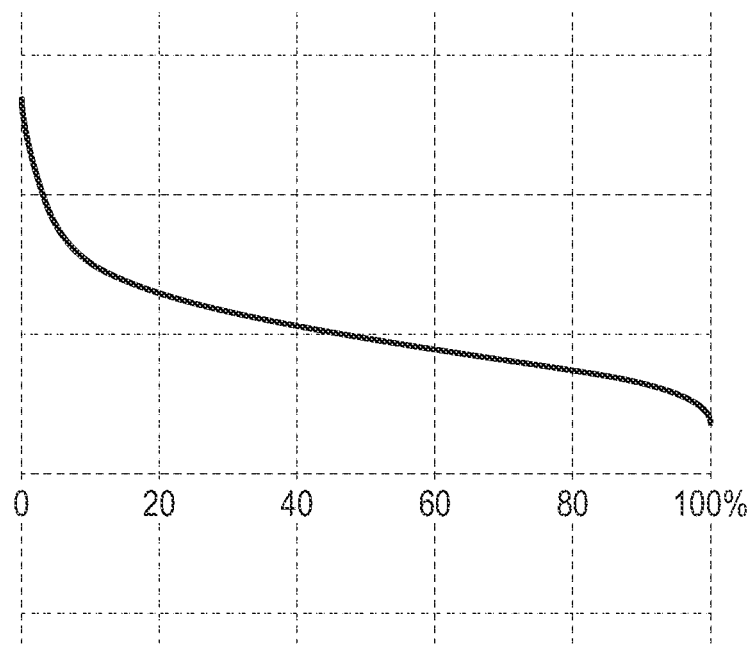
FIG. 2 is a material curve output of the Abbot-Firestone Curve analysis per ISO 13565-2 for a poly(vinyl acetal) sheet of the invention having a textured surface.

FIG. 2 is a material curve output of the Abbot-Firestone Curve analysis per ISO 13565-2 for a poly(vinyl acetal) sheet of the invention having a textured surface. The x-axis is plotted as percentage, and the y-axis is plotted as the distance from the intersection in microns (µm).

Figure 3:
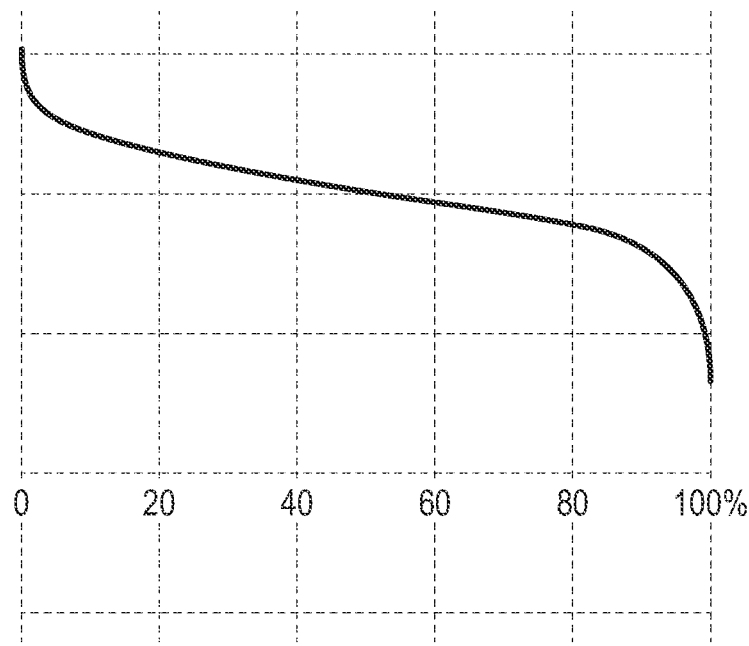
FIG. 3 is a comparative material curve output of the Abbot-Firestone Curve analysis per ISO 13565-2 for a poly(vinyl acetal) sheet having a random rough surface formed by melt fracture of the polymer melt exiting die lips during the extrusion process.

FIG. 3 is a comparative material curve output of the Abbot-Firestone Curve analysis per ISO 13565-2 for a poly(vinyl acetal) sheet having a random rough surface formed by melt fracture of the polymer melt exiting die lips during the extrusion process. The x-axis is plotted as percentage, and the y-axis is plotted as the distance from the intersection in microns (µm). The sheet in FIG. 3 falls outside the scope of the claimed invention.

Figure 4:
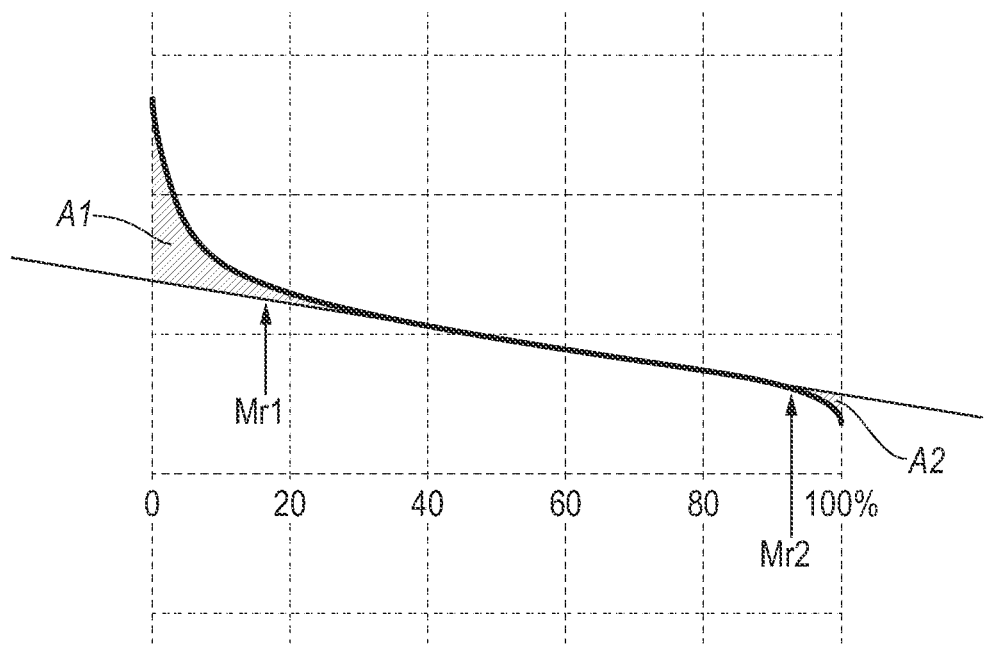
FIG. 4 is a depiction of a best fit line for the curve of FIG. 2.

FIG. 4 is a depiction of a best fit line for the curve of FIG. 2. The x-axis is plotted as percentage, and the y-axis is plotted as the distance from the intersection in microns (µm). FIG. 4 shows Mr1, which is the smallest material ratio of the core roughness profile and Mr2, which is the highest material ratio of the core roughness profile. A1 is the material filled profile area peak, which is the cross-sectional area of the peaks projecting (upward) from the core roughness profile per millimeter of the measuring length. A2 is the material filled profile valley area, which is the cross-sectional area of the peaks projecting (downward) from the core roughness profile per millimeter of the measuring length. As can be observed in FIG. 4, A1 is greater than A2 (by area). For the sheet shown in FIG. 4, Mr1 is 18%, Mr2 is 93%, and the ratio of Mr2/Mr1 is 5.2. This value for the Mr2/Mr1 ratio falls within the scope of claim 1.

Figure 5:
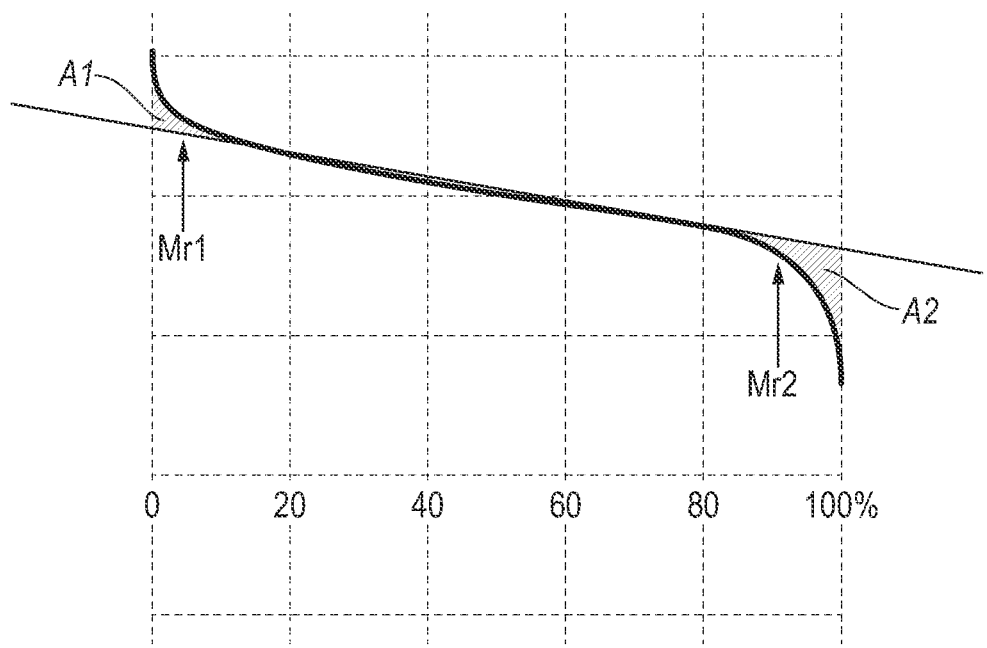
FIG. 5 is a depiction of a best fit line for the curve of FIG. 3.

FIG. 5 is a depiction of a best fit line for the curve of FIG. 3. The x-axis is plotted as percentage, and the y-axis is plotted as the distance from the intersection in microns (µm). Similar to FIG. 4, FIG. 5 shows A1, A2, Mr1, and Mr2. As shown in FIG. 5, A1 is less than A2 (by area), Mr1 is 8%, Mr2 is 91%, and the ratio of Mr2/Mr1 is 11.7, which falls outside the scope of claim 1.

Figure 6:
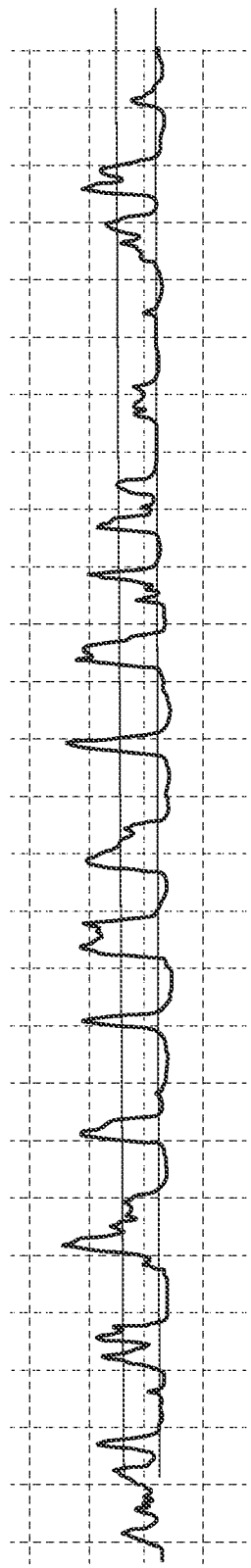
FIG. 6 is a roughness profile depiction of the sheet of FIG. 2.

FIG. 6 is a roughness profile, i.e., a two-dimensional, depiction of the sheet of FIG. 2 above, showing the core line (lower line) and the peaks rising above that line, and limited valleys falling below the core line. The x-axis is in microns (250 microns per grid line); the y-axis is also in microns (25 microns per grid line).

Figure 7:
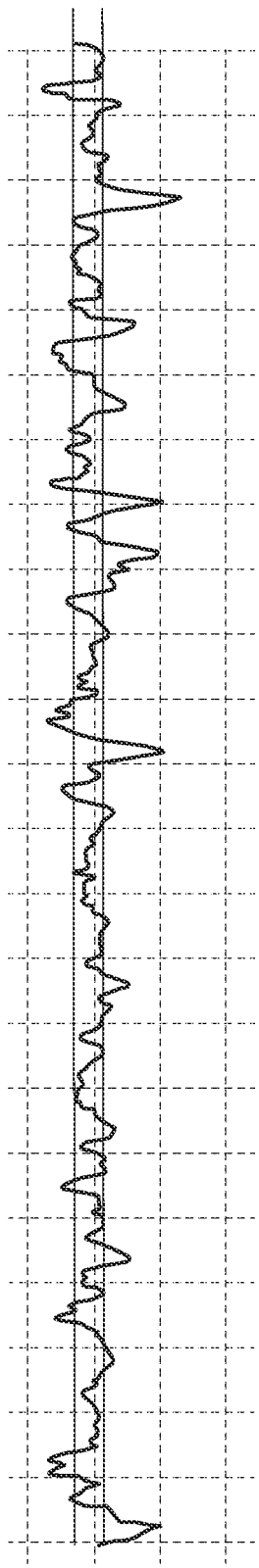
FIG. 7 is a roughness profile depiction of the sheet of FIG. 3.

FIG. 7 is a roughness profile, i.e., a two-dimensional, depiction of the comparative sheet of FIG. 3 above, showing the core line (lower line) and the peaks rising above that line, and significant valleys falling below the core line. The x-axis is in microns (250 microns per grid line); the y-axis is also in microns (25 microns per grid line).

This novel textured surface on such sheets, as will be more fully discussed below, was found to provide superior deairing performance and defect elimination, during the relatively short nip-rolling processes utilized in a portion of the safety glass industry.

The textured surface can be rendered on the poly(vinyl acetal) sheet by an engraved stamp, a laser light, or crush-cut type instrument which penetrates the polymeric surface to create the textured surface. In one embodiment, the crush-cut type instrument is a roller which has been "blasted" or surface modified by the kinetic energy of various grades of randomly-sized hard materials, thus resulting in a roller which has a random texture having the negative of the desired poly(vinyl acetal) sheets having a textured surface. In one embodiment, the roller is comprised of carbon steel. According to the blasting method, a particulate blasting material can be blown against the surface of the roll at a high speed. The blasting material can be, for example, Alundum (artificially fused alumina), emery and steel grids obtained by crushing steel shots. In one embodiment, the blasting material is silicon carbide having a grit size of about 20-24 (i.e., a mixture of 20 and 24 grit size).

Once the roll has been blasted in this fashion, it must be truncated, for example with a grinding or "sanding" surface, for example from an original surface roughness of about 85 to 100 µm Rz to a final value of about 70 or 60 or 50 or 40

μm Rz. By truncating the peaks, this also reduces the Mr2/Mr1 ratio of the ultimate poly(vinyl acetal) sheet. See FIG. 6 which shows that truncating the roll is effectively decreasing the values because the roll is the "negative" of what texture appears on the polymeric sheet, and the truncating step is effective in reducing the magnitude and also to "flatten" the negative peaks (which are valleys in the sheet). Compare this to FIG. 7, where the roughness is formed by melt fracture and there is no truncating of a roller. As shown in FIG. 7, there are many peaks and valleys in the sheet, and the Mr2/Mr1 ratio would be significantly higher.

The textured surface ultimately resulting on the poly(vinyl acetal) sheets of the present invention can be described with the following parameters.

First, surface roughness (Rz) will be described. For a given surface pattern, the surface roughness, or the height of particular peaks on the roughened surface from the imaginary plane of the flattened poly(vinyl acetal) interlayer sheet, is the Rz value of the surface. The two-dimensional surface roughness, or Rz, of the surface of a polymer interlayer sheet when described herein will be expressed in microns (μm) as measured by a 10-point average roughness in accordance with DIN EN ISO-4287 of the International Organization for Standardization (ISO) and ASME B46.1 of the American Society of Mechanical Engineers (ASME). (Note that DIN EN ISO-4287 superseded DIN 4776 which is the standard referenced by the S3P instrument which was used to measure roughness (Rz) in the Examples. ISO 13565-2, which defines roughness material ratio values (i.e., Mr1 and Mr2), references DIN EN ISO-4287).

In general, under these scales, Rz is calculated as the arithmetic mean value of the single roughness depths Rzi (i.e., the vertical distance between the highest peak and the deepest valley within a sampling length) of consecutive sampling lengths (or traces of the surface), as shown by the formula below.

$$Rz = 1/N \times (Rz_1 + Rz_2 + \ldots Rz_n)$$

In general, Rz is not limited to measurements for textured surfaces of polymer interlayer sheets. Rz can be utilized to measure the surface typography of both textured and non-textured polymer interlayer sheets (non-textured polymer interlayer sheets are also referred to as random rough sheets). It should be noted that while Rz is one of many values or measurements traditionally utilized to describe the surface of a polymer interlayer sheets, Rz values alone do not characterize the complete profile of the surface. Rz values are considered two-dimensional measures used to describe the surface of the polymer interlayer sheets. The final interlayer, whether formed from extrusion or co-extrusion in the case of a multilayer construction, has in certain embodiments, a random rough surface topography afforded via the utilization of the blasted and truncated roll as described above. The surface texture affords certain minute raised and depressed portions on the surface of the polymer interlayer, which has been found to be effective in enhancing the de-airing process and reducing the occurrence of air bubbles and ultimately iceflower defects in the final safety glass structure. In this regard, the sheets of the invention have textured interlayers with a surface roughness retention (i.e., Rz2/Rz1) (%) of less than 85% after heating for 5 minutes at 100° C. In other embodiments of the invention, the range for surface roughness retention (%) after heating for 5 minutes at 100° C. is less than 80%, or less than 75%. In embodiments, ranges for surface roughness retention (%) after heating for 5 minutes at 100° C. are greater than 30%.

Second, surface texture ratio (Str) will be described. Str is a three-dimensional spatial parameter that is only used to describe three-dimensional surfaces. Str is a measure of the texture aspect ratio of the surface of the polymer interlayer sheet. The texture aspect ratio of the surface of the polymer interlayer sheet is important because it is an indicator of the surface isotropy. The Str parameter values range between 0 and 1 without a unit. An Str value of 0 or close to 0 represents a strongly anisotropic surface and reflects a very regular pattern and a Str value of 1 or close to 1 represents an isotropic surface and reflects a very random pattern. A surface is isotropic when it presents identical characteristics regardless of the measurement of direction. For a random surface texture or pattern, no texture or pattern stands out. Conversely, an anisotropic surface has patterns or oriented surfaces that may be described as regular surface patterns. For additional information about the three-dimensional parameters, see, for example, "New 3D Parameters and Filtration Techniques for Surface Metrology", Francois Blateyron, 2006, the entire disclosure of which is incorporated herein.

The surface texture in certain embodiments has a high degree of randomness, as described by the variable Str ("texture aspect ratio"), of greater than about 0 and less than about 0.9 or greater than 0.15, but less than about 0.9, or greater than about 0.4 to less than about 0.7. In other words, the Str is a measure of uniformity of the surface texture as described in ISO 25178.

In this aspect of the invention, the surface texture has a surface peak to valley distribution as determined by the S3P (according to DIN 4776 and DIN 4762:01:89 (DIN 4762)). In this regard, Mr1 is defined as separation between peaks and core profile (i.e., peaks-core profile). Mr2 is defined as separation between core profile and valleys (i.e., core profile-valleys). The Material Ratio (Mr2/Mr1) as defined above is in one embodiment from about 3 to about 10. In one embodiment, Mr1 values (peaks-core profile) can be above about 10. In embodiments, the Mr1 values can be less than about 20.

Third, a low surface area profile described or reflected by the variable Sdr ("developed interfacial area ratio") is in one embodiment less than about 0.414 but greater than about 0.01, or greater than about 0.05 to less than about 0.25, or about 0.1 to 0.2. Per ISO 25178, the Sdr variable defines the deviation level from a flat plane. This parameter is expressed as the percentage of the definition area's additional surface area contributed by the texture as compared to the planar definition area. In certain embodiments, this value is intentionally lowered because of the relatively short compression times in the nip roller process.

The fourth parameter used to describe the surface is roughness spacing (Rsm). In embodiments, the surface of the sheet has a Rsm value of above 230 μm to about 600 μm or about 350 μm to about 450 μm (as measured using the S3P and according to DIN 4776).

In one embodiment, the polymeric sheet comprises a polymer chosen from a poly(vinyl acetal) such as a poly(vinyl butyral), as those polymers are known to be utilized as interlayers in the safety glass or architectural glass industries, such as Butvar® PVB resins available from Eastman Chemical Company. In one embodiment, the polymeric sheet is comprised of poly(vinyl butyral).

In one embodiment, the polymeric sheet is a single layer interlayer. In one embodiment, the polymeric sheet is a multiple layer interlayer. In one embodiment, the polymeric sheet is a trilayer interlayer comprising two skin layers and a core layer where the skin layers and core layer have different compositions, such as those disclosed in U.S. Pat. Nos. 5,340,654, 5,190,826, and 7,510,771, incorporated herein by reference. In one embodiment, the polymeric sheet is a wedge-shaped interlayer such as those disclosed and described in U.S. Pat. Nos. 7,846,532, 8,574,706, 7,886,871, 8,033,360, and 8,695,756, incorporated herein by reference.

As used herein, the terms "multilayer" and "multiple layers" mean an interlayer having more than one layer, and multilayer and multiple layer may be used interchangeably. Multiple layer interlayers typically contain at least one soft layer and at least one stiff layer. Interlayers with one soft "core" layer sandwiched between two more rigid or stiff "skin" layers have been designed with sound insulation properties for the glass panel. Interlayers having the reverse configuration, that is, with one stiff layer sandwiched between two more soft layers have been found to improve the impact performance of the glass panel and can also be designed for sound insulation. Examples of multiple layer interlayers also include the interlayers with at least one "clear" or non-colored layer and at least one colored layer or at least one conventional layer, e.g., non-acoustic layer, and at least one acoustic layer. Other examples of multiple layer interlayers include interlayers with at least two layers with different colors for aesthetic appeal. The colored layer typically contains pigments or dyes or some combination of pigments and dyes. The layers of the interlayer are generally produced by mixing a polymer resin such as poly(vinyl butyral) with one or more plasticizers and melt processing the mix into a sheet by any applicable process or method known to one of skill in the art, including, but not limited to, extrusion, with the layers being combined by processes such as co-extrusion and lamination. Other additional ingredients may optionally be added for various other purposes. After the interlayer sheet is formed, it is typically collected and rolled for transportation and storage and for later use in the multiple layer glass panel, as discussed below.

Multilayer interlayers such as a trilayer interlayer having a soft core layer and two stiffer skin layers are commercially available. The stiff skin layers provide handling, processing and mechanical strength of the interlayer; the soft core layer provides acoustic damping property. In embodiments, the residual vinyl acetate group and/or residual hydroxyl group in the polyvinyl acetal resin in the soft core layer is at least 2 wt. % lower than the residual vinyl acetate group and/or residual hydroxyl group in the polyvinyl acetal resin in the stiff skin layers. In embodiments, the plasticizer content in the soft core layer is at least 8 phr (parts per hundred resin by weight) higher than the plasticizer content in the stiff skin layers. In embodiments, the glass transition temperature of the soft core layer is lower than about 20° C. Whether comprised of a single layer or a multilayer construction, the polymeric sheets of the present invention have at least one surface which is textured as described here.

As noted above, the textured surface is somewhat random in certain embodiments, having in general an appearance of peaks and valleys, wherein the relative number of peaks exceeds the number of valleys, with valleys in this context understood to be "inverse peaks" extending below the general median surface (see FIG. 7, comparative) and wherein the valleys are significantly flatter (see FIG. 6). In this fashion, upon collapse and finishing of the glass/interlayer/glass structure, there are ultimately fewer valleys within which air can be trapped, nucleate, and then give rise to, for example, an iceflower defect.

In general terms, the process of the invention can be carried out using a two oven/two nip deairing process per the following steps:

a. the PVB interlayer having the surface features as set forth herein is applied to a panel such as a piece of glass and another piece of glass applied thereon, wherein the glass is heated to a temperature in the range of about 30° ° C. to 70° C. (or the combined glass plus interlayer structure is heated to this range) in one oven;

b. the combined structure is then run through a nip-roller, where the initial compression is performed through a pre-determined gap, generally about 60 to 85% of the total structure thickness and a nip-roller pressure of about 40 psi to 110 psi;

c. the combined structure is then placed in a second oven at a temperature of about 75° C. to about 125° C., for a short period of time (which can vary by product shape and available customer equipment);

d. the combined structure is then run through a second nip roller with the same gap distance and pressure of nip roller as in step b; followed by e. placement in an autoclave for final finishing, where the peak autoclaving temperature and pressure are from 125° C. to 155° C. and from 40 psi to 200 psi, respectively, and peak hold time is from 20 minutes to 60 minutes.

The unique surface texture set forth above was found to not change appreciably during steps (a) and (b), but rather was found to begin collapsing during a short oven cycle at temperatures of about 90° C. to 110° C. which is found to be a key temperature range for shaping a poly(vinyl butyral) (PVB) sheet, deairing PVB in a glass laminate, and several types of defect formation. As the temperature is raised again during the deairing steps, such as in the second oven/nip step, the structural features on the surface of the PVB continue to collapse as desired and in one embodiment, to less than 60% of its original value. The improved process of the invention, relying on the unique surface texture of the polymeric sheet thus advantageously allows for suitable construction of a laminated PVB/glass structure utilizing existing nip roller manufacturing systems as well as providing faster throughput of materials. In this regard, the process can be a single oven/nip process followed by autoclave where oven temperatures is about 40° C. to about 80° ° C. Accordingly, in another aspect, the invention provides a process for preparing a glass laminate, which comprises: a method for deairing and laminating two glass panels and a textured polymeric sheet disposed between said panels, which comprises:

a. applying the textured polymeric sheet to a sheet of glass, and a second piece of glass applied thereon, to form a glass/polymeric sheet/glass structure, wherein the glass or the structure is heated to a temperature of about 40° ° C. to 80° ° C. to provide a combined structure; followed by b. processing the combined structure through a nip-roller, wherein the initial compression is performed through a pre-determined gap of about 60 to about 85% of the combined structure thickness and a nip-roller of about 40 psi to 110 psi, thereby providing light transmission values of greater than about 80%;

c. followed by autoclaving said laminate using peak autoclaving temperature of 125° C. to 155° C., peak pressure of 50 psi to 200 psi, and peak hold time of 20 minutes to 60 minutes;

wherein the textured polymeric sheet is as set forth herein.

In the practice of this method, step (c) may be repeated one or more times if desired. In one aspect, the invention provides a process which can utilize only two sequential "nip" steps at generally lower temperatures for the first nip and higher temperatures for the second nip. Accordingly, in another aspect, the invention provides a method for deairing and laminating two glass panels and a textured polymeric sheet disposed between said panels, which comprises:
 a. applying the textured polymeric sheet to a sheet of glass, and a second piece of glass applied thereon, to form a glass/polymeric sheet/glass structure, wherein the glass or the structure is heated to a temperature of about 30° ° C. to 70° ° C. to provide a combined structure; followed by
 b. processing the combined structure through a nip-roller, wherein the initial compression is performed through a pre-determined gap of about 60 to about 85% of the combined structure thickness and a nip-roller pressure of about 40 psi to 110 psi;
 c. followed by heating said laminate to a temperature of about 90° C. to about 110° C.;
 d. followed by again processing the combined structure through a nip-roller, wherein the initial compression is performed through a pre-determined gap of about 60 to about 85% of the combined structure thickness and a nip-roller pressure of about 40 psi to 110 psi, thereby providing a laminate structure having light transmission values of greater than about 80%;
wherein the textured polymeric sheet is as set forth herein.

The textured polymeric sheets of the invention may be single-layer or multilayer structures as described herein. Accordingly, in another embodiment, the invention provides the two aspects above, wherein the textured polymeric sheet is a multilayer interlayer.

As stated, the polymeric sheet is the textured sheet of the present invention, which affords improved deairing, and by virtue of the performance of the surface, whose "peaks" tend to collapse at the desired temperature range set forth above.

Referring to FIG. 1, this is a depiction of a defect known as an "iceflower" which forms in an installed windshield which results from incomplete deairing during the formation of the glass-interlayer laminate. When deairing is incomplete, initiation and expansion of air bubbles, at elevated temperatures experienced during the windshield in service (e.g., 50° C. to 100° C.), the stresses from the bending gap or glass mismatch tend to cause the bubbles to expand in the path of least resistance in random radial directions within the core layer (in a trilayer interlayer, for example). As the defects continue radial expansion, branches and dendritic-like features form, and give the undesirable optical appearance of iceflowers. This defect also typically leads to a separation between the layers, thereby reducing the structural integrity of the panel.

The surface texture provided by the present invention provides defect reduction as well as considerable processing flexibility as will be shown in the experimental data and Table 1 below. In this regard, the inventors found that while nip roller systems typically use two nip rollers in sequence, the thermal and deairing performance of the sheets of the present invention are amenable to the use of only one such nip roller, thus greatly expanding the processing flexibility for the laminator using such poly(vinyl acetal) sheets. This performance can be measured by clarity of laminate after the first nip, as measured by photometer, and trapped air by measure of bubbles after autoclaving the laminate, and optionally subjecting the laminate to the bake temperature, for example, at 100° C. and above. As will be seen in the experiments below, no bubbles were observed, and there was high clarity after only the action of the first nip roller, which was superior to the comparative examples as set forth.

EXAMPLES

Example 1

Three (3) rollers were surfaced to a roughness target of 85 µm Rz+/−5 µm and about 300 µm Rsm with a silicon carbide grit blast process. Rollers were then truncated at levels of 0% (Roller 1), 20% (Roller 2) and 40% (Roller 3) reduction of roughness (Rz) from the starting level per standard methods known in the art. Final roller levels after truncating were approximately 85 µm Rz (Roller 1), 70 µm Rz (Roller 2) and 50 µm Rz (Roller 3). From this, PVB sheet was separately textured by each roller to a 40 µm Rz+/−5 µm target. These textured sheets were then put between 2 sheets of glass, processed by a two oven/two nip process, and evaluated per the iceflower (defect) test procedure as further described below. Results are shown in Table 1 below.

TABLE 1

| Roller ID | Truncated Amount (%) | Sheet Roughness (Rz, µm) | Iceflower Defect Level | Mr2/Mr1 Ratio |
|---|---|---|---|---|
| Roller 1 | 0 | 40 | Many | 12-18 |
| Roller 2 | 20 | 40 | Few | 11-15 |
| Roller 3 | 40 | 40 | None | 6-10 |

The results in Table 1 indicate defect rates are well correlated to the Mr2/Mr1 ratio. As the ratio increases, the level (or number) of defects increases. Truncating the rollers increased the flatness of the "inverse peaks" or valleys of the textured surface of sheets, thereby decreasing the Mr2/Mr1 ratio.

Example 2

A fourth roller (Roller 4) was surfaced to a 50 µm target Rz with a silicon carbide grit blast process as described above, with no additional truncating. Using Roller 4, PVB sheet was embossed to a target surface roughness of 40 µm Rz+/−5 µm and laminated between glass per the iceflower test below. Results are shown in Table 2 below.

TABLE 2

| Roller ID | Truncated Amount (%) | Roller Roughness (Rz, µm) | Sheet Roughness (Rz, µm) | Sheet Surface Spacing (Rsm, µm) | Defect Level | Mr2/Mr1 Ratio |
|---|---|---|---|---|---|---|
| Roller 4 | 0 | 50 | 40 | 230 | Many | 12-16 |
| Roller 3 | 40 | 50 | 40 | 350 | None | 6-10 |

The data in Table 2 indicates that texturing the roller(s) (or the roller texture or surface roughness) and sheet roughness (Rz) levels alone only partially influence the superior performance of the sheets of the invention. The flatter valleys of the sheet produced from Roller 3 that has been truncated (by 40%) resulted in a lower Mr2/Mr1 ratio, which accounts primarily for the superior performance of the sheet.

Example 3

Various samples were tested to determine how well they performed. The samples that were tested for various properties include:

Disclosed Sample 1 (D1)—PVB trilayer sample of the invention having a random textured surface formed using a roller that has been prepared as described herein.

Comparative Sample 1 (C1)—PVB trilayer sample commercially available from Eastman Chemical Company having an embossed surface pattern and a surface roughness level (Rz) similar to sample D1. The pattern of C1 is such as that disclosed in U.S. Pat. No. 7,883,761.

Comparative Sample 2 (C2)—PVB trilayer sample of commercially available trilayer (from a supplier other than Eastman Chemical Company) having an embossed surface and a surface roughness level (Rz) similar to sample D1.

Comparative Sample 3 (C3)—PVB monolithic sheet sample commercially available from Eastman Chemical Company having a random rough surface formed by melt fracture of the polymer melt existing die lips during the extrusion process.

Deairing efficiency was measured by making samples of three different interlayers (D1, C1 and C2 described above) and running them through one nip roll. Table 3 shows the laminate clarity after one nip at 3 different temperatures (40° C., 55° C. and 75° C.) and before autoclave finishing (also referred to as prepress transmission). The number of bubble defects in the laminate are observed right after completion of the autoclave cycle. Results are shown in Table 3 below.

TABLE 3

| Sample | 40° C. Light Trans. (%) | 40° C. Number of Bubbles | 55° C. Light Trans. (%) | 55° C. Number of Bubbles | 75° C. Light Trans. (%) | 75° C. Number of Bubbles |
|---|---|---|---|---|---|---|
| D1 | 99 | 0 | 99 | 0 | 99 | 0 |
| C2 | 77 | Several | 84 | Few | 99 | 0 |
| C1 | 50 | Several | 55 | Several | 85 | Few |

As shown by the data in Table 3, the interlayers of the present invention, compared to commercially-available interlayers, have excellent clarity as shown by high light transmission after one nip roll deairing at each of the deairing temperatures. The interlayers of the present invention also show no bubbles after the autoclave, indicating that the surface pattern of the present invention affords better deairing.

The samples were also tested to determine roughness level changes after heating at different temperatures. The amount of surface retention (%) was also determined by measuring the roughness (Rz) before and after heating of the sample to 100° C. Surface retention is shown as a percentage. The samples were also tested to determine various surface properties including Sdr, Str, and Mr2/Mr1 ratio, as well as to qualitatively measure the light transmission (clarity), iceflower performance and bubble performance. The iceflower performance and bubble performance are observed after the samples are laminated using the two oven/two nip deairing process followed by completing the autoclave cycle and after the laminates are subjected to the simulated iceflower test and to a bake temperature of 100° C. for 16 hours, respectively. Data is shown in Tables 4 and 5 below.

TABLE 4

| Sample | Original Roughness (Rz, μm) (Rz1) | Roughness 40° C. @ 30 min (Rz, μm) | Roughness 50° C. @ 30 min (Rz, μm) | Roughness 60° C. @ 30 min (Rz, μm) | Roughness 100° C. @ 5 min (Rz, μm) (Rz2) | Roughness 125° C. @ 5 min (Rz, μm) | Roughness 150° C. @ 5 min (Rz, μm) | Roughness retention at 100° C.; (Rz2/Rz1) |
|---|---|---|---|---|---|---|---|---|
| D1 | 38 | 38 | 38 | 38 | 29 | 25 | 23 | 76% |
| C1 | 38 | 38 | 38 | 38 | 30 | 25 | 22 | 79% |
| C2 | 40 | 40 | 40 | 40 | 35 | 28 | 24 | 87.5% |
| C3 | 38 | 38 | 38 | 38 | 38 | 34 | 27 | 100% |

TABLE 5

| Sample | Surface Retention at 100° C.; (Rz2/Rz1) | Mr2/Mr1 Ratio | Sdr | Str | Light Trans. | Iceflower Performance | Bubble Performance |
|---|---|---|---|---|---|---|---|
| D1 | 76% | 5.2 | 0.1 | 0.6 | Excellent | Excellent | Excellent |
| C1 | 79% | 12.7 | 0.414 | 0.2-0.3* | Poor | Fair/Poor | Poor |
| C2 | 87.5% | 8.6 | 0.15 | 0.6 | Fair | Fair | Fair |
| C3 | 100% | 11.7 | N/A | 0.3-0.6* | Poor | N/A | Fair |

*result varied upon multiple measurements so the range is shown

As shown by the data in Tables 4 and 5, the samples of the invention have better heat behavior at 100° C., which is considered a key glass temperature in a traditional nip roll processing operation. At over 100° C., the individual components start to become a laminate as the interlayer flows between and adheres to the glass. The data also shows that sample D1, which has an Mr2/Mr1 ratio of 5.2, Str of 0.6, Sdr of 0.1 and surface retention at 100° C. of 76% has excellent clarity, iceflower and bubble performance, which is better than the comparative samples C1, C2 and C3. Sample C2, which has Mr2/Mr1 ratio of 8.6, has higher surface retention and only fair clarity, iceflower and bubble performance. Samples C1 and C3, which both have higher Mr2/Mr1 ratios, have poor clarity and poor or fair bubble performance. Sample C1 also has fair/poor iceflower performance. Sample C3 was not tested for iceflower performance as it is a monolithic or single layer interlayer. The relative occurrence of iceflowers, (or iceflower performance, ranked as "Excellent", "Fair", and "Poor" by the iceflower defect simulation as further shown below) is ranked by the percentage of laminates that developed iceflower defects (or stated differently, the number of the laminates that developed the defects in the total number of the test laminates). An "Excellent" iceflower performance means the percentage of the defect is less than 20% or from 0 to less than 20%; a "Fair" iceflower performance means the percentage of the defect is greater than 20% or from 20% to 40%; and a "Poor" iceflower performance means the percentage of the defect is greater than 40%. Similarly for bubble performance, an "Excellent" means no bubbles, "Poor" has many bubbles, and "Fair" means some bubbles. As can be seen from Table 4 and Table 5, when the surface roughness (Rz) is about the same, the bubbles and iceflower performance are mainly determined by an interlayer's Mr2/Mr1 ratio and surface retention at 100° C.

Test Methodology/Procedures:
Surface Retention Procedure:

Surface Retention is a measurement of the amount of surface roughness retained after heating. This is calculated by measuring the surface roughness of an interlayer before (Rz1) and after heating (Rz2). To determine surface retention, measure and record original roughness (Rz1) in the extrusion (machine) direction or direction most representative to capture the surface pattern design. Cut a square piece of PVB approximately 6"×6" around the measured section (which contains the first roughness measurement, Rz1 area). Using a previously constructed 6"×6" metal frame (2 pieces) for support, place the sample into the frame as follows, forming a 'sandwich' (side view):

| | | |
|---|---|---|
| XXXXX | XXXXX | Metal frame |
| ----- | ----- | PET film* |
| =============== | | Interlayer sheet |
| ----- | ----- | PET film* |
| XXXXX | XXXXX | Metal frame |

*The PET film can be a Mylar ® plastic film (typically about 2-5 mil) that is a biaxially oriented poly(ethylene terephthalate) film.

The assembly is secured by attaching clamps (such as alligator clamps) around the frame. The goal is to prevent any linear contraction or expansion of the interlayer during heating. Stand the frame assembly in an oven heated to 100° C., orienting the frame parallel to the oven air flow (sample facing forward). Close the oven and allow 5+/−0.5 minute hold time in the oven. Remove the frame from the oven after 5 minutes, and with the warm sample remaining in the frame, allow the assembled sample to cool to room temperature (for about 15 minutes). It is important to ensure that the sample is cooled to room temperature (after 100° C., 5 minute heat) prior to re-measurement of the surface. If the sample is removed from the frame while still warm, shrinkage will occur, which will affect the re-measured surface reading. Once the sample is cooled, re-measure the surface roughness (this will be Rz2) of the sample in the same direction and location of the initial measurement (Rz1). The surface retention is calculated as: Surface retention (%)=Rz2/Rz1.

For example, to measure and calculate surface retention, an interlayer sample is measured and has a starting roughness of 40 μm Rz (Rz1). The sample is then heated for 5 minutes at 100° C. by following the test previously described. After heating, the sample is measured again, and the surface roughness after heating is 32 μm (Rz2). To calculate the surface retention, the following equation is used: Surface retention=Rz2/Rz1. For the example, Rz2/Rz1=32/40=80% surface retention.

Iceflower Defect Simulation Procedure

The formation of iceflowers in trilayer acoustic PVB laminates can be tested by simulating the real world situation in windshields and other glazings where the combination of large bending gaps and poor de-airing are known to be among the root causes for iceflower development in the field. First, a 30 cm by 30 cm trilayer interlayer with a polyethylene terephthalate (PET) film ring (with an inside diameter of 7.5 cm; an outside diameter of 14 cm; and a thickness of 0.10 mm to 0.18 mm) placed in the center is sandwiched between two 30 cm by 30 cm pieces of glass to form a construct. The construct is then pre-laminated, generally using a two-oven/two-nip process for deairing, and autoclaved. The resulting laminates are allowed to condition at room temperature for 48 hours, baked in a conventional oven (at 80° C.) for 48 hours, and then allowed to cool. The laminates are then visually inspected to determine the rate of iceflower formation in the laminate (e.g., the percentage of laminates that developed iceflower defects) and the percentage of area within the PET ring with iceflower defects. Additionally, the laminates are visually inspected to determine the percentage of iceflower formation within the entire laminate (including both inside and outside the PET film area).

Glass Transmission Level Measurement:

Light transmission (%) values were made (in the visible region of the spectrum) using an adhesion photometer (Tokyo Denshoku #S-904356). On each sample tested here, four (4) measurements were made. The glass laminate is inserted into the photometer and the value recorded. The sample is then removed and rotated so that one (1) measurement is made in each corner of a 12"×12" glass laminate. The individual results are averaged to give the light transmission %. The measurements were made at a glass temperature range of about 23° C. to 27° C. These measurement can be done using any instrument and method described in either JIS K7361 or ISO 13468-1 to determine the total luminous transmittance, in the visible region of the spectrum, of planar transparent and substantially colorless plastics, using a single-beam photometer with a specified CIE Standard light source and photodetector.

The invention has been described in detail with particular reference to certain embodiments thereof, but it will be understood that variations and modifications can be effected within the spirit and scope of the invention.

The invention claimed is:

1. A poly(vinyl acetal) polymeric sheet having at least one textured outer surface, wherein the textured surface is characterized by:
   a. an Mr2/Mr1 ratio of 3 to 10, as determined by ISO 13565-2;
   b. a surface roughness, Rz, of 20 μm to 60 μm;
   c. an Sdr value of greater than equal to 0.05 and less than 0.414, as determined by ISO 25178;
   d. an Rsm value of 230 μm to 600 μm; and
   e. a surface retention value (Rz2/Rz1) at 100° C. of less than 85%; and wherein the Str value is greater than 0.4 and less than 0.7.

2. The sheet of claim 1, wherein the surface roughness, Rz, is 25 μm to 50 μm.

3. The sheet of claim 1, wherein the Mr2/Mr1 ratio is 4 to 10.

4. The sheet of claim 1, wherein the Mr2/Mr1 ratio is 4 to 9.

5. The sheet of claim 1, wherein the Mr2/Mr1 ratio is 5 to 9.

6. The sheet of claim 1, wherein the Sdr value is greater than 0.05 but less than 0.25, as determined by ISO 25178.

7. The sheet of claim 6, wherein the Sdr value is 0.1 to 0.2, as determined by ISO 25178.

8. The sheet of claim 1, wherein the Rsm value is 350 μm to 450 μm.

9. The sheet of claim 1, wherein the polymeric sheet comprises a poly(vinyl butyral).

10. The sheet of claim 1, wherein the polymeric sheet is a multilayer polymeric sheet.

11. A method for deairing and laminating two glass panels and the textured polymeric sheet of claim 1, disposed between said panels, which comprises:
   a. applying the textured polymeric sheet to a sheet of glass, and a second piece of glass applied thereon, to form a glass/polymeric sheet/glass structure, wherein the glass or the structure is heated to a temperature of 40° C. to 80° C. to provide a combined structure; followed by
   b. processing the combined structure through a nip-roller, wherein the initial compression is performed through a pre-determined gap of 60 to 85% of the combined structure thickness and a nip-roller of 40 psi to 110 psi, thereby providing light transmission values of greater than 80%;
   c. followed by autoclaving said laminate using peak autoclaving temperature of 125° C. to 155° C., peak pressure of 40 psi to 200 psi, and peak hold time of 20 minutes to 60 minutes.

12. A method for deairing and laminating two glass panels and the textured polymeric sheet of claim 1, wherein the textured polymeric sheet is disposed between the glass panels, comprising:
   a. applying the textured polymeric sheet to a sheet of glass, and a second piece of glass applied thereon, to form a glass/polymeric sheet/glass structure, wherein the glass or the structure is heated to a temperature of 30° to 70° C. to provide a combined structure; followed by
   b. processing the combined structure through a nip-roller, wherein the initial compression is performed through a pre-determined gap of 60 to 85% of the combined structure thickness and a nip-roller pressure of 40 psi to 110 psi;
   c. followed by heating said laminate to a temperature of 90° C. to 110° C.;
   d. followed by again processing the combined structure through a nip-roller, wherein the initial compression is performed through a pre-determined gap of 60 to 85% of the combined structure thickness and a nip-roller pressure of 40 psi to 110 psi, thereby providing a laminate structure having light transmission values of greater than 80%.

13. The method of claim 11, wherein the light transmission value is greater than 85%.

* * * * *